Nov. 27, 1923. 1,475,170
R. S. CARTER
LEAF SPRING AND SPRING SUSPENSION
Filed Oct. 29, 1919
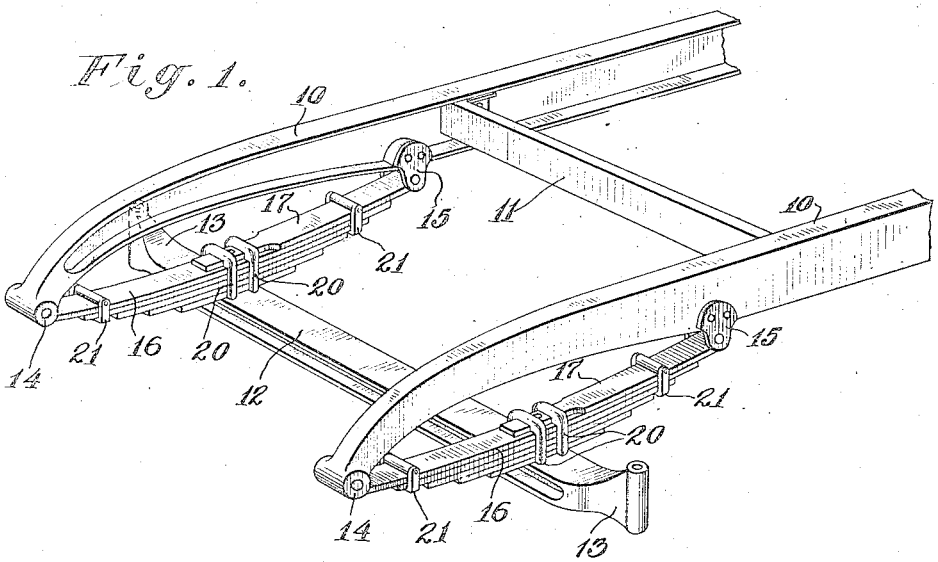
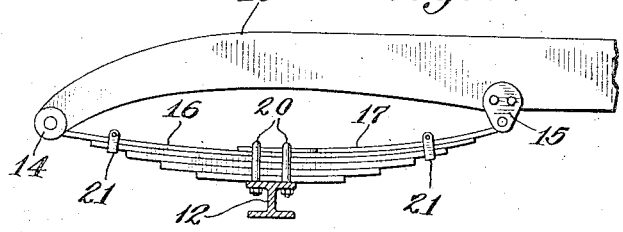
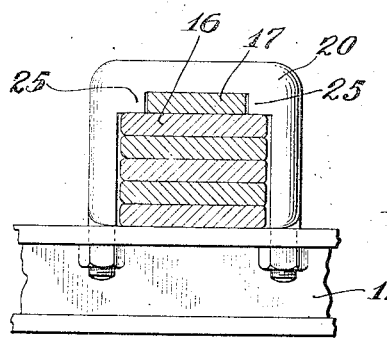
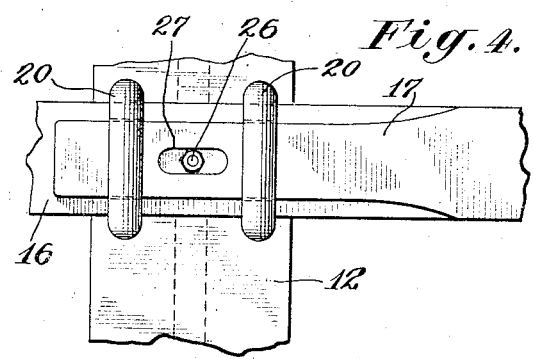
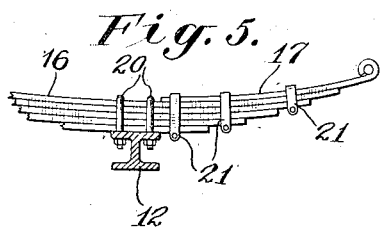
Russell S. Carter
INVENTOR
BY Jeffery, Kimball
 + Eggleston
his ATTORNEY Patented Nov. 27, 1923.

1,475,170

UNITED STATES PATENT OFFICE.

RUSSELL S. CARTER, OF HEWLETT, NEW YORK.

LEAF SPRING AND SPRING SUSPENSION.

Application filed October 29, 1919. Serial No. 334,217.

*To all whom it may concern:*

Be it known that I, RUSSELL S. CARTER, a citizen of the United States of America, residing at Hewlett, county of Nassau, State of New York, have invented certain new and useful Improvements in Leaf Springs and Spring Suspensions, of which the following is a specification.

My invention in so far as it relates to leaf springs per se, is applicable to various devices. The object of my invention in leaf springs is to eliminate the swinging shackles customarily used at the ends of leaf springs prior to my invention and thereby eliminate certain undesirable features of shackled leaf springs. By my invention fixed brackets may be used at both ends of the spring.

My invention also relates to self-propelled vehicles for when springs of my invention are substituted, in whole or in part, for the shackled springs heretofore customarily used on self-propelled vehicles, certain advantages thereof appear which are peculiar to these vehicles. The primary objects of my invention, in self-propelled vehicles are to eliminate the ill effects peculiar to those vehicles which are directly traceable to the spring shackles and to secure certain advantages not obtainable in these vehicles with shackled springs. When my invention is applied adjacent the steering axle of a self-propelled vehicle, it tends to eliminate or minimize the twisting effect on the axle under road shocks and thus tends to aid the steering considerably and reduce the strain on the driver. When my spring suspension is applied to the power axle it tends to eliminate or reduce the weight of the torque rods, since by reason of the construction of the spring suspension the power for propelling the vehicle may be applied to the frame of the vehicle through the spring suspension directly to a greater or less extent, thereby tending to the elimination, in in whole or in part, of the torque rods used commonly prior to my invention.

In carrying out my invention I provide the leaf spring with means slideable with respect to and longitudinally of the spring for attaching one end of the spring to its support or the part or device which it supports. This attaching means may be fixed rigidly both with respect to the spring and with respect to the part or device to which the corresponding end of the spring is thereby attached, except for the sliding movement and except that the spring must be slightly rotatable, in its own plane, about said part or device. The other end of the spring also may be rigidly attached to its respective cooperating part or device except for a similar slight rotating movement. The sliding attachment means may be and preferably is one or more of the leaves of the spring itself, the clips of the spring being so arranged that this one or group of leaves of the spring may slide longitudinally of the spring, or rather longitudinally of the remaining leaves of the spring, when the spring is stressed. The spring and the various elements of the spring of my invention may assume various forms some of which I have hereinafter described in detail.

In the accompanying drawing and the following description I have illustrated and described in some detail the best embodiments of my invention of which I am now aware; I have illustrated and described my invention with particular reference to the steering axle of a self-propelled vehicle, in which application I now believe my invention will find its greatest usefulness but to which application my invention is not limited as I have hereinbefore pointed out.

Fig. 1 is a perspective view of the front end of the frame of the self-propelled vehicle with the steering axle and the intermediate springs.

Fig. 2 is an elevation, partly in section, of the device in Fig. 1.

Fig. 3 is an elevation with the spring shown in section showing particularly one of the spring clips by which the spring is fixed to the axle.

Fig. 4 is a plan view of those parts of the spring and axle of Fig. 1 which are adjacent the clip attaching the spring to the axle.

Fig. 5 is an elevation of a modified form of my invention.

The part of the frame of the motor-driven vehicle shown in Fig. 1 comprises two longitudinal frame members 10 and a cross member 11 extending transversely of the vehicle. The steering axle 12 extends transversely of the frame and is provided with the usual steering knuckles 13.

A leaf spring is disposed between each of the frame members 10 and the steering axle 12. Each of these springs is similar in its general make up to the leaf spring common prior to my invention. Generally, each leaf spring comprises a plurality of thin rectangular leaves of different lengths grouped successively on one another to provide a thick midportion and two thinner end portions. The thick midportion of the spring is disposed directly on the axle 12 and the two free ends of the spring are attached to the frame members 10. The leaves of the spring are attached together in quite an ordinary fashion as is later described. It will be understood however that the particular application of the springs just described and the particular relation between the springs and the axle and longitudinal bar 10 of the application illustrated forms no part of my invention except as set forth hereinafter in the claims.

Unlike the constructions known prior to my invention, the bracket devices or parts to which the free ends of each of the springs are attached in Fig. 1, are spaced fixed distances apart; neither one of these devices or parts is a swinging shackle or carries a swinging shackle, so that the cross bolts to which the spring ends are directly attached always maintain fixed positions. The end 14 of each frame member 10 constitutes one bracket or device to which one end of the adjacent spring is attached; the bracket 15 rigidly carried on the same member 10, carries the opposite end of the same spring. The end 14 of the member 10 is bifurcated and provided with a transverse bolt as illustrated. The end of the leaf 16 of the adjacent spring is turned about the bolt in 14 to attach the spring thereto in substantially the same manner as the ends of leaf springs have heretofore been turned about the bolts in shackles; the manner in which the end of the leaf is thus turned or curved is shown in Fig. 5. The leaf 16 reaches not quite to the other end of the spring, that is, to the end of the spring adjacent bracket 15. On top of this leaf 16 is another leaf 17 which comprises the opposite end of the spring and terminates short of the end of the spring adjacent 14. The free end of the leaf 17 is curved about the lower or spring bolt of the bracket 15 in exactly the same way as the opposite end of the spring is coiled about the bolt 14. The bracket 15, as before indicated, is immovable with respect to the vehicle frame. Clips 20 fix the mid-portion of the spring to axle 12; suitable other clips or bands 21 fasten the leaves of the spring together in the well known manner. The clips 21 at the right in Figs. 1 and 2 are so arranged however that the leaf 17 slides therethrough longitudinally of the spring and of the leaf 16 and the other leaves of the spring; optionally of course these clips 21 may be fixed rigidly to the leaf 17 and may be so arranged as to allow the other leaves of the spring to slide longitudinally therethrough. The left hand end of leaf 17, Figs. 1 and 2, is reduced in width as shown. The bottom of the cross bar of each of the clips 20 is slotted to a width a little greater than the reduced width of the leaf 17 and to a depth slightly greater than the thickness of the leaf 17; shoulders 25 are provided as it were on the under face of the cross bar of the clip 20 by which particularly the leaf 16 and the lower leaves of the spring are fixed to the axle 12 while through these slots in the cross bars of the clips 20 rides the reduced portion of the leaf 17. The leaf 16 and the lower leaves of the spring are fixed together by the usual bolt 26 which preferably terminates, however, on the top of the leaf 16 (Fig. 4); the leaf 17 is provided with a longitudinal slot 27 in order that the leaf 17 may slide by this bolt. For the purposes of distinguishing between the two portions of the spring the leaf or leaves 16 and the leaves below may be called the body of the spring and the leaf or leaves 17 termed the sliding leaf element.

It will be observed that by this construction I have eliminated the usual swinging shackles by which leaf springs have been attached prior to my invention. As a substitute for these swinging shackles I have substituted rigid attaching devices as it were, namely, the brackets or devices or parts 14 and 15 (or 17) permanently fixed at predetermined distances apart, the distances between being unvaried during the operation of the vehicle and the distortion of the spring. By reason of the elimination of the swinging shackles I have eliminated considerable of the swinging of the vehicle due to road shocks. As before indicated and for the reasons before set forth, this is particularly important with respect to self-propelled vehicles which are peculiarly subject to severe and rapidly imposed road shocks and which comprise devices, of which the steering mechanism is one, which it is peculiarly advantageous to protect from frequent road shocks. It will be observed too that the spring suspension of my invention is more rigidly attached to the vehicle frame than were shackles used in its make up, whereby this suspension is better adapted to transmit driving power from the power or driven axle than shackled springs and hence my invention tends to the elimination or reduction in weight of the usual torque rods.

The operation of my device is as follows: Starting with the device in the position shown in Figs. 1 and 4, is apparent that any movement of the axle 12 towards the frame members 10, results in the movement of the mid-portion of each spring towards the frame. Heretofore this movement has been accommodated by increasing the distances between the two ends of each spring, that is, by the swinging of a shackle or shackles at one or both ends of the spring which thus allow the two ends of the spring to separate and the spring to distort, the spring at the same time rotating somewhat about the bolts at its ends. In the present instance however, the tendency of the two ends of the spring to separate as the spring is distorted is accommodated by the leaf or sliding means 17. As the axle 12 is moved upward the leaf 17 (in effect) moves to the left in Figs. 1 and 2; correspondingly, when the axle 12 falls with respect to the longitudinal members 10 the leaf 17 is moved to the right: at the same time 16 and 17 rotate somewhat about the attaching bolts in their ends. In other respects the operation of this spring of my invention is similar to the operation of those leaf springs commonly known prior to my invention.

The modification shown in Fig. 5 differs from the form shown in Figs. 1 and 2 principally in that the leaf 17, which is the attaching means of one end of the spring, does not pass under the clips 20 and also is not reduced in width in any part. The leaf 17 is fixed to the spring or the remainder of the spring, only by the bands 21 which surround that part of the spring accommodating the leaf 17. In all respects the operation of this modification is like the operation of the device of the preceding figures except that the leaf 17 slides solely in the clips or bands 21 (or the clips 21 slide with respect to the major part of the spring) instead of sliding within the clips 20 also.

While I have illustrated and described above the best embodiments of my invention of which I am now aware, it will be understood that these embodiments are merely illustrative of my invention and that my invention is not limited thereto. What I regard as my invention and what I desire to secure by Letters Patent is set forth in the following claims.

Claims:

1. A spring comprising a body, a sliding leaf element and clip means, the body comprising a plurality of leaves of different lengths grouped successively one on another to provide a thick mid-portion and flexible ends, and the clip means holding said leaves together one on another in the region of said thick mid-portion, the sliding leaf element constituting part of one of said flexible ends, and being adapted for attachment to the bracket for the said end of the spring and being slidable longitudinally of said body within said clip means, so that the said sliding element constitutes the means for attaching the body to said bracket.

2. In a self-propelled vehicle, the combination with an axle and frame thereof, of a leaf spring supporting the frame on the axle, and a clip for the thick mid-portion of the spring and rigid bracket means for the ends of the spring whereby the spring is fixed to the vehicle frame and axle, the portion of one end of the spring which is fastened to the adjacent bracket means being slidable longitudinally in the clip.

3. A spring comprising a plurality of leaves of different lengths grouped successively one on another to provide a thick mid-portion and flexible ends, a clip for the thick mid-portion, and another leaf, forming part of one of said flexible ends, having its inner end reduced in width and received in a slot in the cross bar of the clip, said leaf being slidable longitudinally in said clip and being adapted to coact with the bracket for its respective end of the spring.

4. A spring comprising a body, a sliding element, and clip means, the said body comprising a plurality of leaves of different lengths grouped to provide a thick portion and a flexible end, and the clip means holding said leaves together in the region of said thick portion and being fixed relative to the leaves of said body, the sliding element extending from said flexible end and sliding within said clip means longitudinally of the body and providing the attaching means for said flexible end of the spring.

In testimony whereof, I have signed this specification.

RUSSELL S. CARTER.